H. L. CHAPMAN.
Fly-Traps.

No. 145,093.

Patented Dec. 2, 1873.

Witnesses.
E. Wolff
Sedgwick

Inventor,
H. L. Chapman
Per
Munn & Co.
Attorneys.

UNITED STATES PATENT OFFICE.

HERMAN L. CHAPMAN, OF MARCELLUS, MICHIGAN.

IMPROVEMENT IN FLY-TRAPS.

Specification forming part of Letters Patent No. 145,093, dated December 2, 1873; application filed August 23, 1873.

*To all whom it may concern:*

Figure 1:
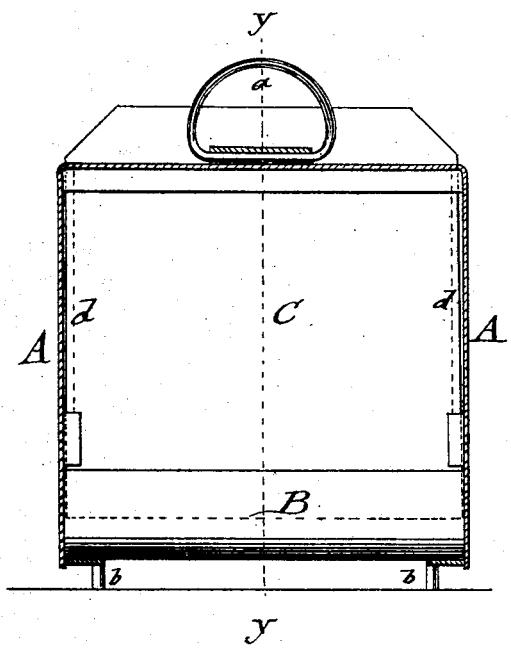
Figure 2:
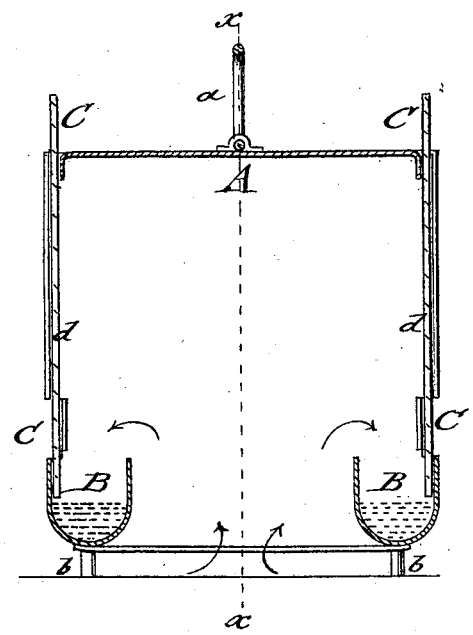

Be it known that I, HERMAN L. CHAPMAN, of Marcellus, in the county of Cass and State of Michigan, have invented a new and Improved Fly-Trap, of which the following is a specification:

In the accompanying drawing, Figures 1 and 2 represent, respectively, vertical, longitudinal, and transverse sections of my improved fly-trap on the lines $x\ x$ and $y\ y$.

Similar letters of reference indicate corresponding parts.

The invention will first be fully described, and then pointed out in the claim.

In the drawing, A represents a tin casing, made by preference of one piece, which forms two sides and the top of the trap, and is open at the bottom. A handle or ring, $a$, is applied to the top part, by which the trap may be easily changed from one place to another. Laterally-connecting tin troughs B are soldered to the sides of casing A, and contain soap-suds, in which the flies get killed. Feet B, of sufficient height to admit the flies below the trough and the sides of the trap, are provided at the bottom parts of troughs B. The open sides of the trough along the trap are closed by sliding glass panes C, which may be easily taken out and slipped in by grooves $d$ of casing A.

The glass panes C fit closely to the sides of the troughs so that no fly can escape.

The bait is placed inside the casing A, whose bottom opening is shaded more or less by the tin casing, so that the flies, after once being in the trap, do not crawl out the same way, but fly to the light toward the glass panes, and get drowned in the troughs.

The glass panes C may be taken out for cleaning and refitting with but little trouble.

Having thus described my invention, I claim as new and desire to secure by Letters Patent—

A bottomless fly-trap having the two side-glasses C C sliding out and in the troughs B, as and for the purpose described.

HERMAN L. CHAPMAN.

Witnesses:
   Mrs. ESTHER M. GOLDSMITH,
   MOSES E. MESSENGER.